(12) United States Patent
Albal et al.

(10) Patent No.: US 6,996,227 B2
(45) Date of Patent: Feb. 7, 2006

(54) SYSTEMS AND METHODS FOR STORING INFORMATION ASSOCIATED WITH A SUBSCRIBER

(75) Inventors: Nandakishore Albal, Scottsdale, AZ (US); Paul Bartlett, Winnetka, IL (US)

(73) Assignee: Motorola, Inc., Schaumburg, IL (US)

( * ) Notice: Subject to any disclaimer, the term of this patent is extended or adjusted under 35 U.S.C. 154(b) by 116 days.

(21) Appl. No.: 10/000,598

(22) Filed: Oct. 24, 2001

(65) Prior Publication Data

US 2003/0076934 A1    Apr. 24, 2003

(51) Int. Cl.
*H04M 15/00* (2006.01)
*H04M 1/00* (2006.01)

(52) U.S. Cl. .................. 379/355.05; 379/121.05; 379/355.02

(58) Field of Classification Search ............. 379/88.11, 379/88.21, 88.01–88.04, 355.01–355.06, 379/88.22, 88.23, 69, 121.05; 455/414.1
See application file for complete search history.

(56) References Cited

U.S. PATENT DOCUMENTS

| | | | | |
|---|---|---|---|---|
| 5,353,336 A | * | 10/1994 | Hou et al. ................. | 379/88.02 |
| 5,452,340 A | * | 9/1995 | Engelbeck et al. ........ | 379/88.03 |
| 5,511,111 A | * | 4/1996 | Serbetcioglu et al. ..... | 379/88.01 |
| 5,526,407 A | * | 6/1996 | Russell et al. ............ | 379/88.01 |
| 5,583,919 A | * | 12/1996 | Talvard et al. ........... | 379/88.03 |
| 5,644,625 A | * | 7/1997 | Solot ....................... | 379/88.22 |
| 5,717,738 A | * | 2/1998 | Gammel .................. | 379/88.03 |
| 5,917,891 A | * | 6/1999 | Will ........................ | 379/88.03 |
| 6,026,158 A | * | 2/2000 | Bayless et al. ......... | 379/355.08 |
| 6,108,630 A | * | 8/2000 | Kuechler et al. ........... | 704/270 |
| 6,370,237 B1 | * | 4/2002 | Schier ..................... | 379/88.03 |
| 6,396,913 B1 | * | 5/2002 | Perkins, III ............ | 379/112.01 |
| 6,462,616 B1 | * | 10/2002 | Beswick et al. ......... | 379/88.03 |
| 6,516,202 B1 | * | 2/2003 | Hawkins et al. ......... | 455/556.2 |
| 6,574,599 B1 | * | 6/2003 | Lim et al. .................... | 704/270 |
| 6,731,730 B1 | * | 5/2004 | Zolotov ..................... | 379/126 |
| 6,744,861 B1 | * | 6/2004 | Pershan et al. .......... | 379/88.03 |
| 6,751,296 B1 | * | 6/2004 | Albal et al. ................ | 379/67.1 |
| 2003/0083988 A1 | * | 5/2003 | Reith .......................... | 705/40 |

* cited by examiner

*Primary Examiner*—Fan Tsang
*Assistant Examiner*—Joseph T Phan
(74) *Attorney, Agent, or Firm*—Hisashi D. Watanabe

(57) ABSTRACT

A method to store information in an address book (122) is provided. The method includes the steps of creating a record for each call placed by a subscriber, each record including one or more telephone numbers (404), determining if the telephone number(s) of the record matches one of a plurality of telephone numbers stored within the address book (406); and storing the telephone number(s) in the address book (412). A system and computer program are also disclosed to store information in the address book.

7 Claims, 7 Drawing Sheets

SYSTEMS AND METHODS FOR STORING INFORMATION ASSOCIATED WITH A SUBSCRIBER

FIELD OF THE INVENTION

The present invention relates generally to communication systems and, more particularly, to methods and systems for storing, updating, and accessing information associated with a subscriber.

BACKGROUND OF THE INVENTION

A telecommunication device, such as conventional and cellular telephones, typically includes a personal telephone directory that allows a user or subscriber to store frequently dialed telephone numbers. The user can access the stored telephone numbers in the directory and direct the telecommunication device to dial a particular telephone number. The directory allows the user to place a call to one or more of the stored numbers without physically dialing the entire telephone number.

In many instances, a user dials a telephone number that is not stored in the telephone directory and may want to add this number to the telephone directory. Unfortunately, traditional telecommunication devices do not always allow users to add a previously called telephone number or a currently dialed number into their telephone directories. In such cases, the user is required to manually enter and store the telephone number in the address book.

It is desirable to provide a system and/or method that allows a user to access and add a previously called telephone numbers or a currently dialed phone number to an address book of his or her telecommunication device. It would also be beneficial to allow the user to update his or her address book with information associated with the previously called number or currently dialed number, including, for example, address and personal information. It would also be desirable to update a subscriber with billing information

DETAILED DESCRIPTION OF THE PREFERRED EMBODIMENT(S)

Figure 1:
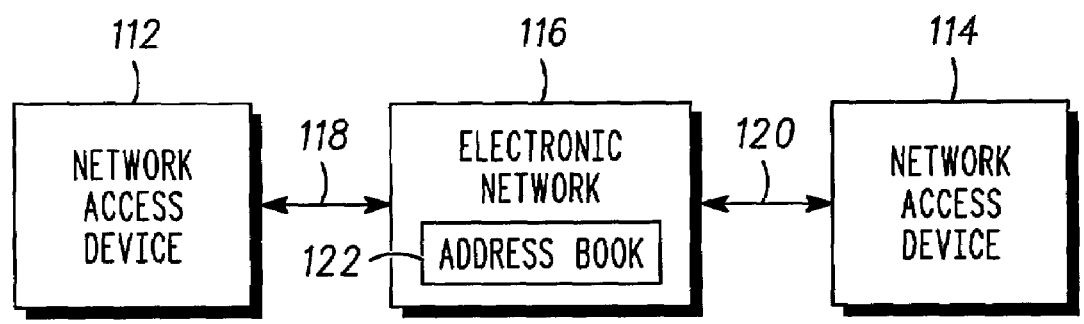
FIG. 1 is a block diagram of a preferred embodiment of a communication system in accordance with the present invention.

FIG. 1 is a block diagram that illustrates an embodiment of a communication system 100. The communication system 100 generally includes one or more network access devices or communication devices 112, 114 (two being shown) and an electronic network 116. The communication system 100 is capable of providing various services and capabilities to cellular subscribers, wire-line telephone subscribers, paging subscribers, satellite subscribers, mobile or portable telephone subscribers, trunked subscribers, computer network subscribers (e.g., Internet or Intranet subscribers), wireless data subscribers, wireless local loop subscribers, branch office users and the like. For example, the communication system 100 can provide speech and/or touch-tone recognition, incoming call authorization, call routing, text-to-speech (TTS) and/or speech-to-text (STT) capabilities, content information, messaging services, call screening, interactive voice applications, etc. As further described below, the communication system 100 can also allow a subscriber or user to add and update information in his or her address book 122 stored in the electronic network. For example, the communication system 100 permits the subscriber to add a currently dialed telephone number, a pager number, and/or a uniform resource link (URL) to his or her address book 122. The communication system 100 also allows the subscriber to add a previously called telephone number to his or her address book 122.

The communication devices 112, 114 can be utilized by subscribers to access and/or connect with the electronic network 116. The communication devices 112, 114 can include a variety of forms, such as, for example, conventional telephones, mobile telephones, paging units, radio units, wireless data devices, World Wide Web (WWW) telephones, portable or wireless telephones, personal information managers (PIMs), personal digital assistants (PDAs), personal computers (PCs), network televisions (TVs), Internet TVs, Internet telephones, portable wireless devices, workstations or any other suitable communication device. It is also contemplated that the communication devices 112, 114 can be integrated within the electronic network 116. Regardless of their specific form, the communication devices 100, 112 have a user-input interface and a user-output interface (not shown). The user-input interface receives input from the subscriber. The user-output interface provides output to the subscriber. Examples of the user-input interface include, but are not limited to, an electroacoustic transducer such as a microphone to receive voice and other audible input from the subscriber, a keypad or a keyboard to receive key strokes from the subscriber, a touchpad or touchscreen to receive touch input from the subscriber, and a pointing device such as a mouse or a trackball to receive point and click inputs from the subscriber. Examples of the user-output interface include, but are not limited to, an electroacoustic transducer such as a speaker to provide voice and other audible output to the subscriber, and a visual display device such as a liquid crystal display or a cathode ray tube to provide graphical and/or textual information to the subscriber. It is noted that the communication devices may include more than one user-input interface and more than one user-output interface. For example, a wireless telephone may have a microphone, a telephone keypad, a speaker, and a visual display device.

The communication devices 112, 114 may also include a voice or Web browser, such as, for example, Motorola's VoML™ voice browser, Netscape's Navigator®, Microsoft's Internet Explorer®, or Mosaic's® browser. It is also contemplated that the communication devices 112, 114 can include an optical scanner or bar code reader to read machine readable data, magnetic data, bar code data, optical data or the like, and further transmit the data to the electronic network 116.

The electronic network 116 of the communication system 100 is preferably coupled to communication device 112 via communication link(s) or line 118, and also preferably coupled to communication device 114 via communication link(s) or line 120. The lines 118, 120 may preferably include, for example, telephone lines, Integrated Services Digital Network (ISDN) lines, coaxial cable lines, cable TV lines, fiber optic lines, computer network lines, digital subscriber lines, dedicated lines, pay or lease lines, virtual private network lines or the like. Alternatively, the communication devices 112, 114 can wirelessly or remotely communicate with the electronic network 116. For example, the electronic network 116 can communicate with the communication devices 112, 114 by either satellite or wireless communication systems, such as, for example, wireless local loop systems, including Local Multi-point Distribution Systems (LMDS) and Multi-channel Multi-point Distribution Systems (MMDS).

The electronic network 116 can receive incoming transmissions or data (e.g., paging and voice transmissions, e-mails, facsimiles, etc.) from the communication device 112 and route the incoming transmissions to either of the communication devices 112, 114. The electronic network 116 can include an electronic assistant to provide various instructions to the subscriber and to respond to voice commands or DTMF tones as further described below. The electronic network 116 may include, for example, an Intranet, an Extranet, a Local Area Network (LAN), a telephone network, (e.g., a Public Switched Telephone Network (PSTN)), a cellular network, a personal communication system, a TV network (e.g., a cable TV system), local, regional, national or global paging networks, an e-mail system, a wireless data network (e.g., satellite data or local wireless data networks), a wireless LAN, a wireless local loop system (e.g., LMDS, MMDS, or CDMA based system), a Voice Over Internet Protocol (VOIP) network, a communication node, etc. The electronic network 116 can also include a wide area network (WAN), such as, for example, the Internet, the World Wide Web (WWW) or any other similar on-line service.

Furthermore, the electronic network 116 can provide various calling capabilities to a subscriber. For example, the electronic network 116 can place a call to a particular contact at a selected location or device in response to voice commands or Dual-Tone Multiple-Frequency (DTMF) signals from the subscriber (e.g., "Call Bob at home", "Call Ann at work", or "Dial Bill on mobile phone"). Alternatively, the subscriber can specify a number to be dialed or called, such as, "Call 630-555-1212."

In addition to the calling capabilities of the communication system 100, the electronic network 116 enables the subscriber to access content information from various providers. The subscriber can access information, such as, news reports, weather updates, traffic information, stock quotes and other financial data, calendar information, personal information including address and telephone information, movie, concert, airline, flower and book information, and any other type of electronic commerce available to the subscriber through the communication system 100.

The electronic network 116 further enables a subscriber to initiate and respond to pages and/or content through voice commands or DTMF signals (e.g., "Page Bob"). The electronic network 116 receives pages and/or content and sends the pages and/or content to the designated subscriber. When a subscriber pages a party or contact, the electronic network 116 can also automatically provide the Automated Number Identification (ANI) or Calling Line Identification (CLI) of the communication devices 112, 114 (e.g., a telephone) that the subscriber is using as a callback number. Alternatively, the subscriber can enter a desired callback number.

Figure 2:
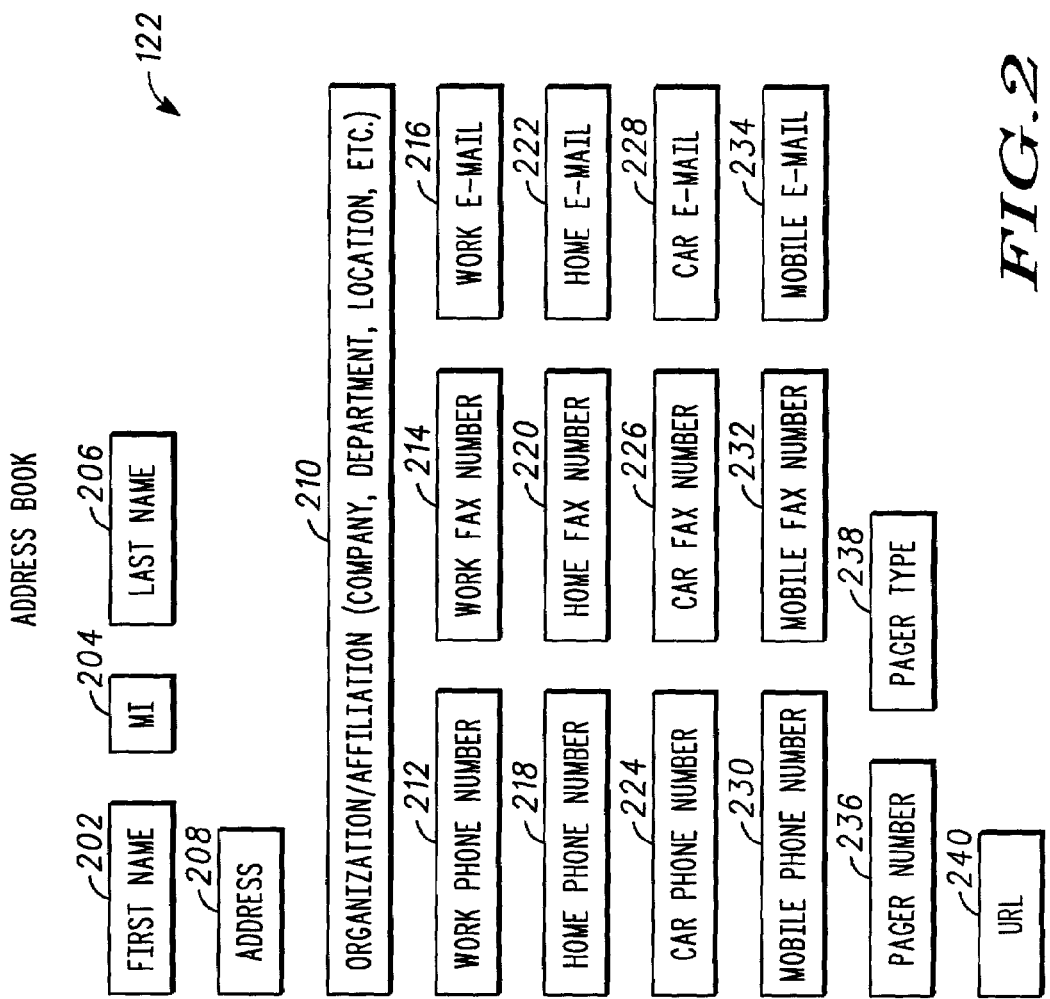
FIG. 2 is an exemplary depiction of an address book in accordance with the present invention.

Referring to FIG. 2 along with FIG. 1, a subscriber can access a personal file or address book 122 stored in the electronic network 116 through the communication devices 112, 114. The address book 122 preferably stores information associated with the subscriber. The address book 122 may include information about the subscriber's contacts, including the contact's name 202, 204, 206, address 208, organization/affiliation 210, work telephone number 212, work fax number 214, work e-mail 216, home telephone number 218, home fax number 220, home e-mail 222, car phone number 224, car fax number 226, car e-mail 228, mobile phone number 230, mobile fax number 232, mobile e-mail 234, pager number 236, pager type 238, Uniform Resource Link (URL) 240, and other similar contact information.

The address book 122 can also include alphabetical hyperlinks, corresponding to the surnames of the persons entered into the address book, with which a subscriber may reference the address book. An exemplary depiction of an address book 122 of the electronic network 116 is shown in FIG. 2. When the subscriber accesses his or her personal address book 122, the electronic network 116 can read information about one or more of the parties stored in the address book 122 and can provide various details to the subscriber (e.g., addresses, etc.). The subscriber can then call the party by using voice commands (e.g., "Call Bob").

The electronic network 116 also allows the subscriber or user to update or change the content of his or her address book 122 while the subscriber is placing a call or paging a contact. For example, a communication node permits the subscriber to add a currently dialed telephone number, a pager number, and a currently entered URL to his or her address book 122. The subscriber may also change the contents of the address book 122, through the use of communication devices (such as a computer) via the Internet. The subscriber can also enter frequently dialed telephone numbers for voice activated dialing using the communication devices.

Figure 3:
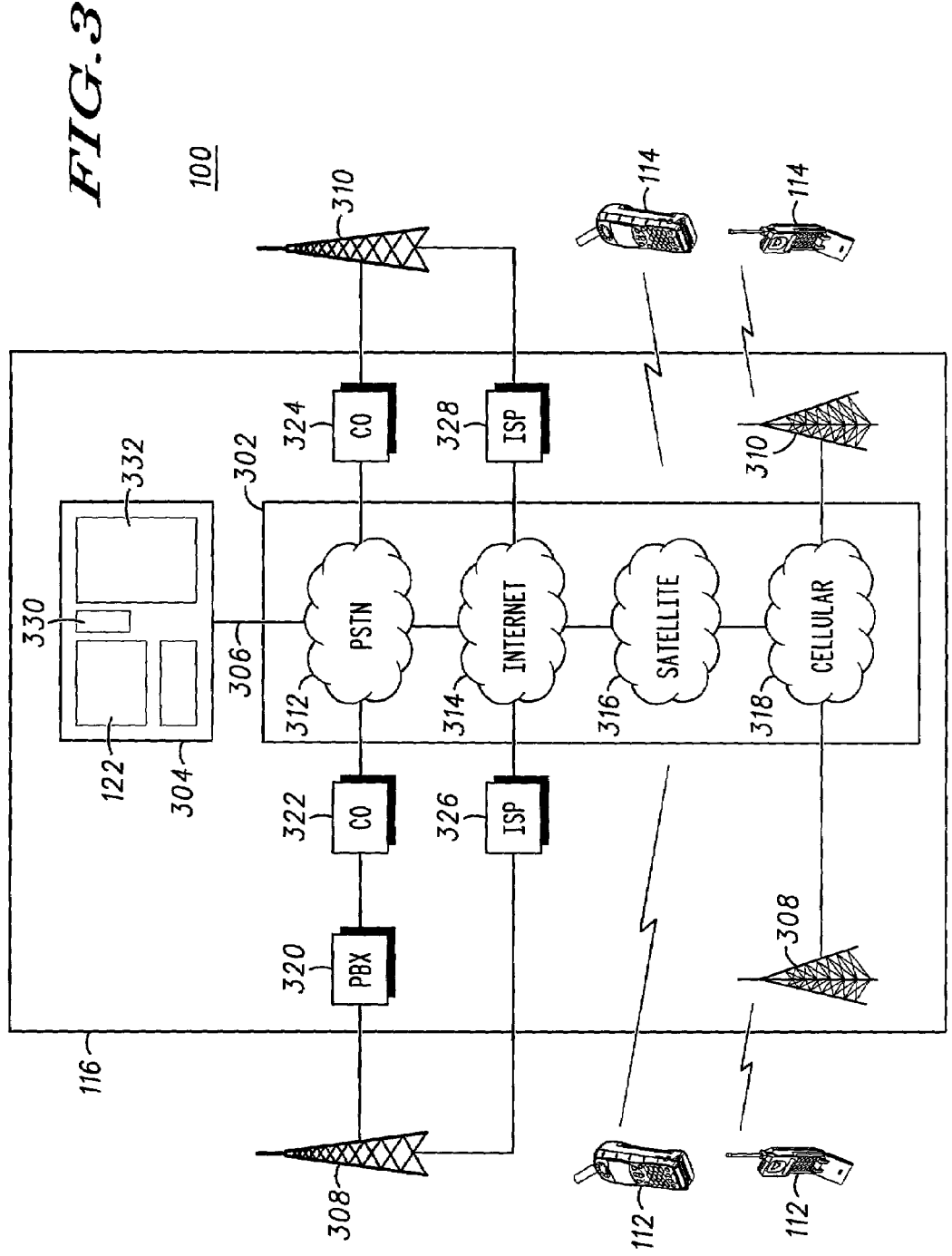
FIG. 3 is a more detailed block diagram of the communication system of FIG. 1.

FIG. 3 illustrates a more detailed block diagram of the communication system 100 of FIG. 1. It will be recognized that the communication system 100 can be implemented in various configurations. As shown in FIG. 3, the electronic network 116 includes a transport system 302 and a communication node 304. The transport system 302 is preferably in communication with the communication node 304 via a high-speed data link 306, such as a T1 telephone line, a local area network (LAN), or a wide area network (WAN). It is contemplated that the communication node 304 may be integrated within or may be remote from the transport system 302. An example of a communication node 304 is the MIX™ platform and the Myosphere™ service provided by Motorola, Inc. of Schaumburg, Ill.

The transport system 302 routes incoming calls from one or more of the communication devices 112 and/or base stations 308 to the communication node 304, and routes outgoing call from the communication node 304 to one or more communication devices 114 or base stations 310. The transport system 302 can include one or more networks, such as, a PSTN 312, an Internet network 314, a satellite network 316, a cellular network 318 or any other suitable network. As shown in FIG. 3, a communication device 112 or base station 308 can be operatively connected to the PSTN 312 through a conventional Private Branch Exchange (PBX) 320 and a Central Office (CO) 322 of a carrier. Similarly, a communication device 114 or base station 310 can be operatively connected to the PSTN 312 of the transport system 302 through the CO 324 of a carrier.

An Internet Service Provider (ISP) 326 can also connect a communication device 112 or base station 308 to the Internet network 314. Similarly, the ISP 328 can operatively connect the Internet network 314 to a communication device 114 or base station 310. Likewise, cellular or mobile telephones 112, 114 can be connect to the cellular network 318 by cellular base stations 308, 310, and a satellite telephone can be connected to the satellite network 316 via a suitable satellite system.

The communication system 100 of FIG. 3 allows users or subscribers to add a currently dialed telephone number or a previously called telephone number to his or her address book 122. When adding a previously called telephone number to the subscriber's address book 122, the communication system 100 preferably keeps a detailed record of each call made by the subscriber, including such factors as the telephone number, the amount of times called, the dates of the calls, the identification and other pertinent information regarding the called party, and the like.

Figure 4:
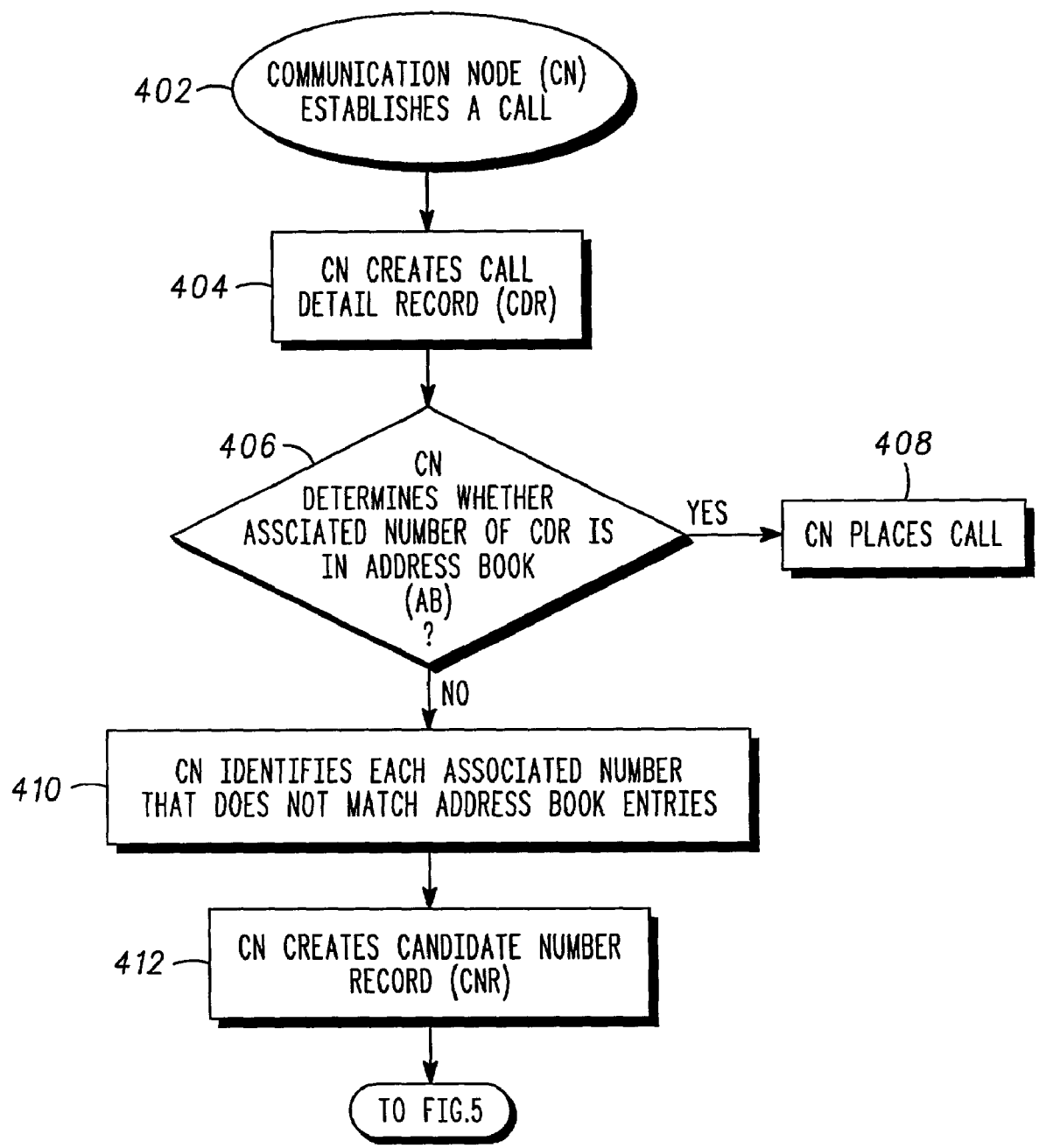
FIGS. 4, 5 and 6 illustrate a preferred routine for adding a previously called telephone number in accordance with the present invention.
Figure 5:
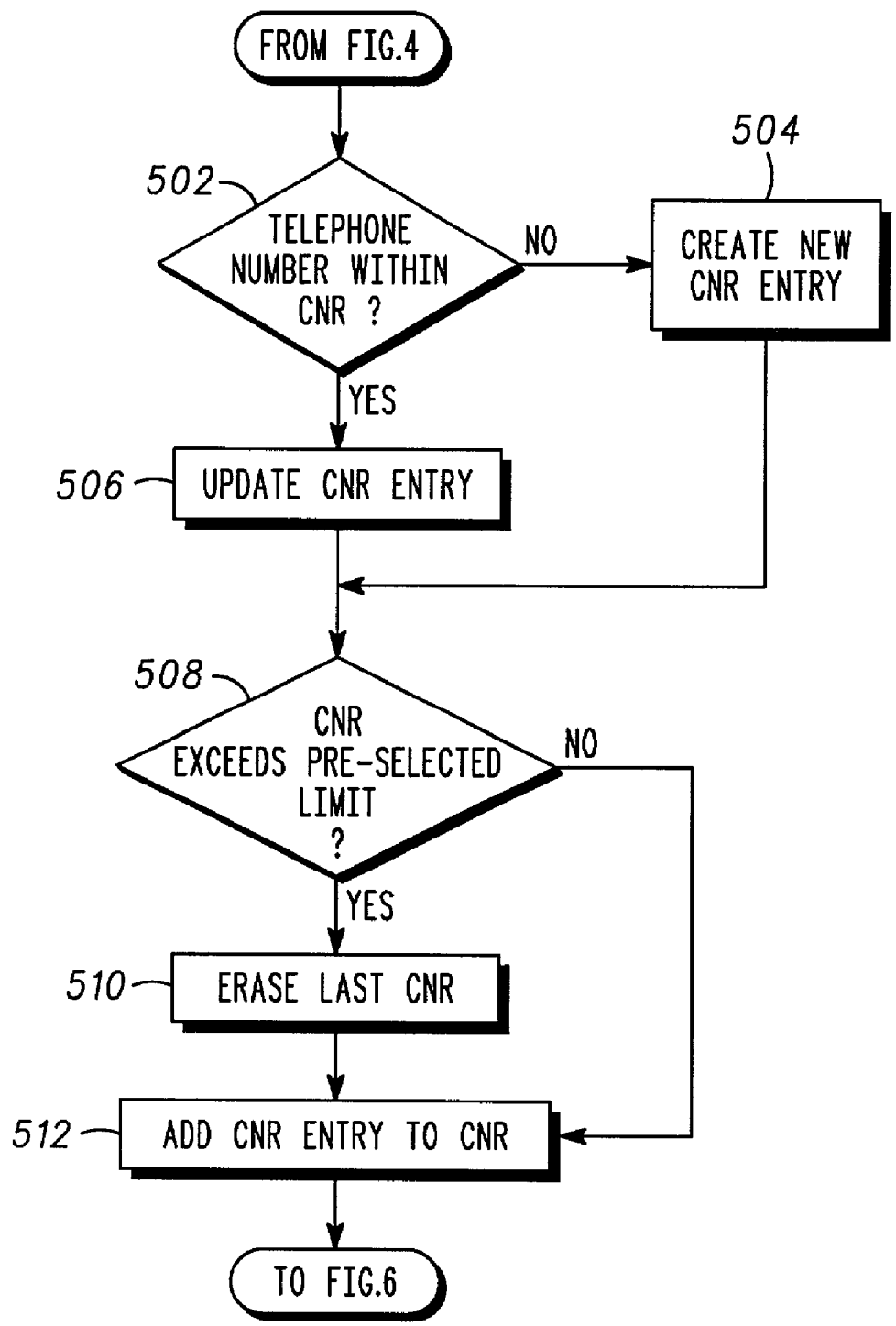
Figure 6:
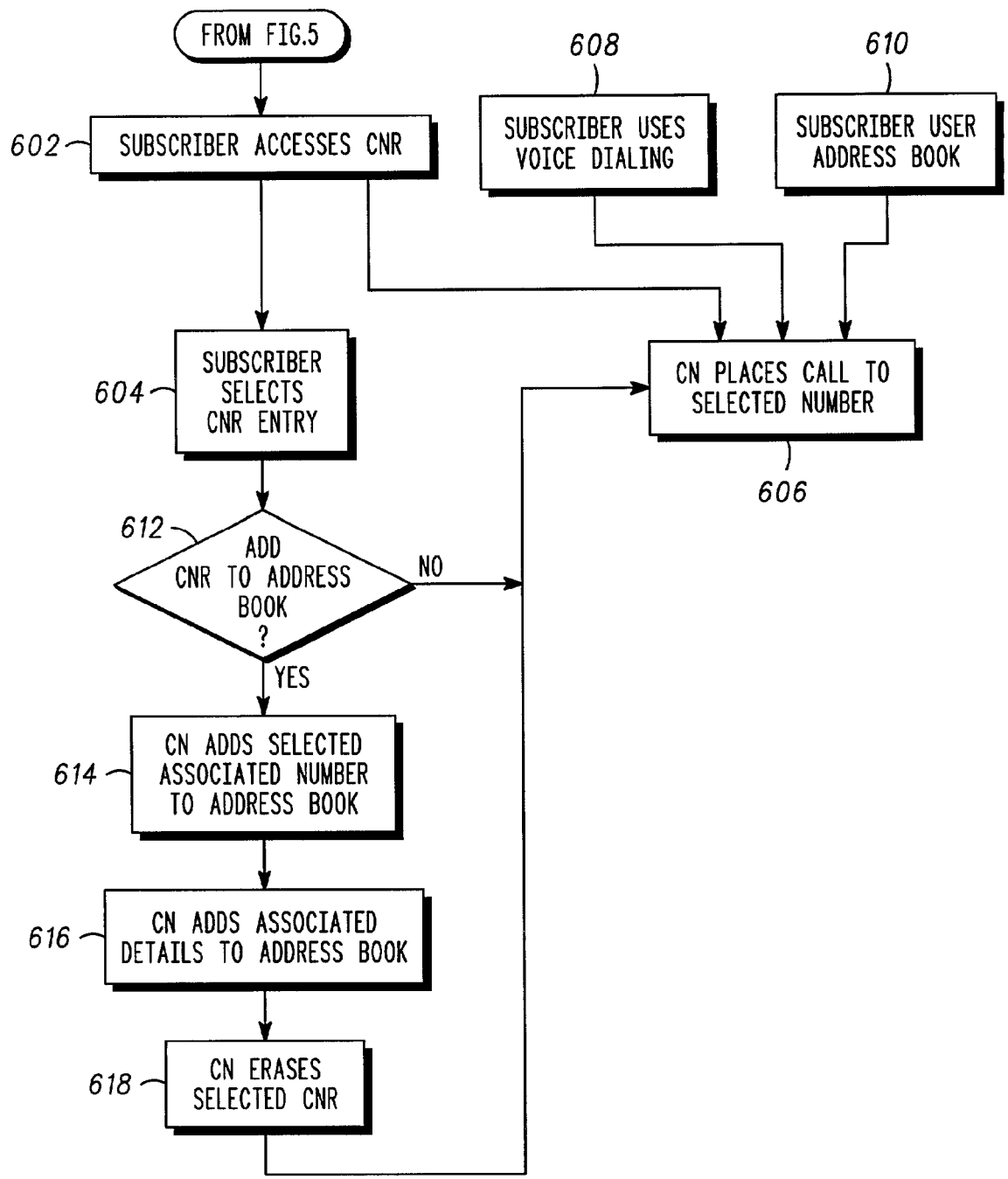

FIGS. 4, 5 and 6 generally show flow diagrams of a preferred routine for adding a previously called telephone number to a subscriber's address book 122. In general, a call-detailed record (CDR) 330 (shown in FIG. 3) is created for each call that is placed by the user or subscriber through a communication node 304. Each CDR 330 includes information concerning the call including its associated telephone number. After a CDR 330 has been created, the communication node 304 determines whether the telephone number stored in the CDR is currently listed in the address book 122 of the user or subscriber. If not, the CDR 330 is identified and entered in a candidate number record (CNR) 332 (shown in FIG. 3). The subscriber can then be led through a series of prompts or menus to determine whether to add the identified telephone number to the address book 122 of the subscriber.

Referring to FIG. 4, the communication node 304 places a call at step 402, in response to commands from a user or subscriber, and establishes a communication channel or connection between the subscriber and the called party. At step 404, the communication node creates or updates a CDR 330 for the outgoing call. It should be noted that a CDR 330 could be created or updated at any time in which the subscriber places a call, including when the subscriber is in communication with another party. The CDR 330 preferably includes a recorded log of the subscriber's usage of the services provided by the communication node, including the telephone number of any outgoing telephone calls made by the subscriber. Each CDR 330 may also include the date and time of each call.

At step 406, the communication node 304 compares the telephone number from a CDR 330 with a stored list of telephone numbers in the subscriber's address book 122. If the telephone number from the CDR 330 matches a stored telephone number in the subscriber's address book 122, the communication node 304 places the call in step 408. If the telephone number from the CDR 330 does not match any one of the stored telephone numbers in the subscriber's address book 122, the communication node 304 creates a candidate number record or list (CNR) 332 including the associated telephone number at steps 410, 412. The CNR 332 is preferably a list of telephone numbers that do not match any one of the telephone numbers stored in the subscriber's address book 122. It will be recognized that the communication node 304 may indicate to the subscriber that the telephone number contained within the CDR 330 does not match with any one of the stored telephone numbers within the subscriber's address book 122.

Once the communication node 304 creates an entry in the CNR 332, the subscriber can add the telephone number stored in the CNR in his or her address book 122. The communication node 304 may limit the number of entries included in CNR 332, or the communication node may allow the subscriber to select a desired number, or category thereof, in the CNR. For example, the communication node 304 may only create an entry in the CNR 332 for telephone numbers that the subscriber dialed more than once. Furthermore, the communication node 304 may also list the most recently dialed telephone numbers at the beginning of the entries included in the CNR 332 and/or list the telephone numbers that are dialed more frequently.

Referring to FIG. 5, the communication node 304, after creating an entry in the CNR 332 for an identified telephone number at step 412, determines whether the identified telephone number is already included within the CNR at step 502. If the identified telephone number is not presently included, the communication node 304 adds the entry to the CNR 332 at step 504. If the identified telephone number is already included within the CNR 332, the communication node 304 updates the existing entry in the CNR at step 506. The communication node 304 will update the entry by placing the existing entry at the top of the CNR 332 and incrementing a counter contained within the CNR, signifying the entry as the most recently called telephone number.

To limit the CNR 332 to a reasonable number of entries, the communication node 304 will first determine the number of entries in the CNR at step 508. If this number is less than the subscriber selected limit or a predetermined limit, the communication node 304 will add the entry to the CNR 332 at step 512. If, on the other hand, the number of entries exceeds the limit, the communication node 304 erases the last CNR 332 entry at step 510, which is preferably the oldest entry in the CNR. The communication node 304 will then add the new entry to the CNR 332 at step 512. It is contemplated that the entries in the CNR can be user selectable or configurable.

Referring to FIG. 6, after updating the CNR 332 at step 512, the communication node 304 presents the subscriber with the option to access the CNR at step 602. The subscriber is then presented with the option of selecting an entry in the CNR 332 at step 604 or the subscriber may direct the communication node 304 to place a call to the telephone number associated with the selected entry of the CNR at step 606. The subscriber may instruct the communication node 304 to place the call at step 608 via audio commands (e.g., inputting his or her voice into an electroacoustic transducer) or manually (e.g., by keying a selection using a keyboard or a keypad or by pointing to a selection using a pointing device or a touchscreen). The subscriber may instruct the communication node 304 to place the call through the use of the address book 122 at step 610.

When the subscriber accesses the CNR 332 via audio commands, the subscriber will be directed to respond to one or more audio prompts. When the subscriber manually accesses the CNR 332, the subscriber is directed through a series of steps and prompted for responses through those steps. The CNR 332 may, for example, be presented in chronological order, and may also be presented by region (i.e., domestic calls, international calls, etc.). It should be noted that the subscriber can access the CNR 332 at any time he or she is in communication with the communication node 304, which may be at the start of, during or after placing a call. When the subscriber accesses the information contained within the CNR 332 while in communication with another party, the second party will preferably be placed on "hold" while the subscriber follows the prompts to access the CNR.

After selecting one of the entries in the CNR 332 at step 604, the subscriber is then given the option of adding the selected telephone number of the entry to the subscriber's address book 122 at step 612. If the subscriber does not add the associated telephone number to the address book 122, the communication node 304 will place the call to the associated telephone number at step 606.

If the subscriber chooses to add the associated telephone number to the subscriber's address book 122 at step 612, the communication node 304 adds the associated telephone number to the subscriber's address book 122 at step 614. The communication node 304 will then prompt the subscriber to enter various information associated with the selected associated telephone number at step 616. The subscriber can also enter other relevant information about the selected associated telephone number, such as, for example, an associated name, address, and/or affiliation, and the like. Additionally, the communication node 304 may prompt the subscriber to indicate the type of communication device associated with the telephone number (e.g., home, office or mobile telephone).

Once the selected associated telephone number has been added to the subscriber's address book 122, the communication node 340 can erase the entry corresponding to the selected telephone number from the CNR 332 at step 618. The communication node 304 can then place the call to the selected telephone number at step 606.

Figure 7:
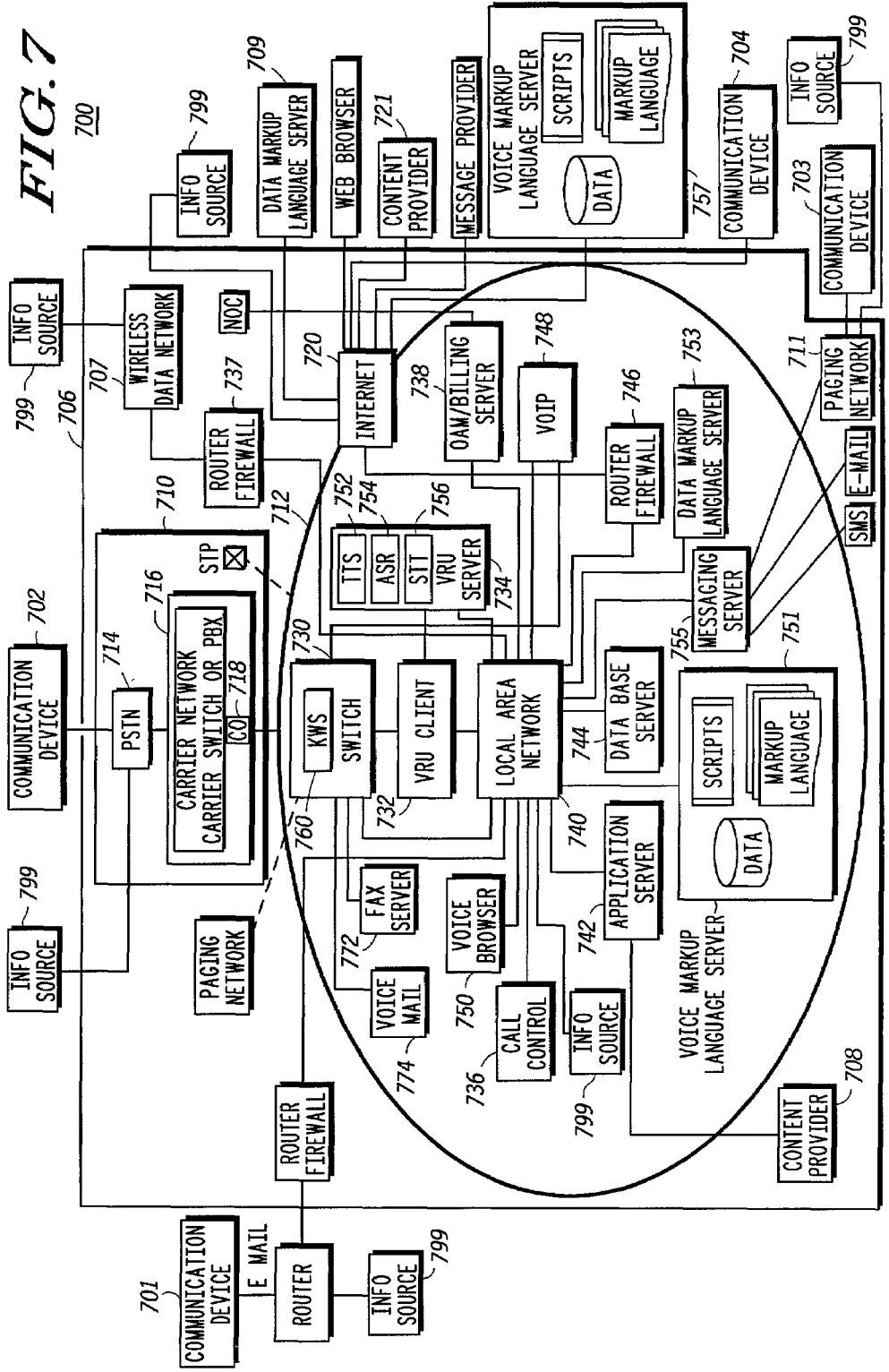
FIG. 7 is an exemplary block diagram of another preferred embodiment of a communication system in accordance with the present invention.

Referring now to FIG. 7, an exemplary block diagram of another preferred embodiment of a communication system 700 having the capability to add information to the address book 122 of a subscriber. The communication system 700 of FIG. 7 can carry out the routines shown in FIGS. 4 through 6.

The communication system 700 generally includes one or more communication devices 701, 702, 703, 704, 705 (five being shown), an electronic network 706, and one or more information sources (e.g., content providers 708, 721 (two being shown) and data and voice markup language servers 709, 751, 753, 757. The communication devices can be the same or similar to the network access devices or communication devices 112, 114 described in reference to FIGS. 1 and 2. Accordingly, further description of the communication device is unnecessary for a complete understanding of the present embodiment.

The subscriber can access the electronic network 706 by dialing a single direct access telephone number (e.g., a foreign exchange telephone number, a local telephone number, or a toll-free telephone number or PBX) from the communication device 702. The subscriber can also access the electronic network 706 from the communication device 704 via the Internet or WWW, from the communication device 704 via a paging network 711, or from the communication device 701 via a LAN, a WAN, an e-mail connection or in any other similar manner.

As shown in FIG. 7, the electronic network 706 of the system 700 includes a telecommunication network 710 and a communication node 712. The telecommunication network 710 is preferably connected to the communication node 712 via a high-speed data link, such as, for example, a T1 telephone line, a LAN, a WAN or a VOIP network. The telecommunication network 710 preferably includes a PSTN 714 and a carrier network 716. The telecommunication network 710 can also include, for example, international or local exchange networks, wireless local loop, cable TV networks, inter-exchange carrier or long distance carrier networks, cellular networks (e.g., mobile switching centers), PBXs, satellite systems, wireless data networks and other switching centers such as conventional or trunked radio systems (not shown), etc. The electronic network 706 can also include additional telecommunication networks, such as, for example, a wireless data network 707 or any of the networks or systems described above.

The PSTN 714 of the telecommunication network 710 can include various types of communication equipment, such as, for example, ATM networks, Fiber Distributed Data networks (FDDI), T1 lines, cable TV networks, VOIP networks and the like. The carrier network 716 generally includes a telephone switching system or central office 718. It will be recognized that the carrier network 716 can be any suitable system that can route calls to the communication node 712, and the telephone switching system 718 can be any suitable wire-line or wireless switching system.

The communication node 712 of the system is preferably configured to receive and process incoming calls from the carrier network 716 and the Internet 1220, such the WWW. The communication node 712 can receive and process pages from the paging network 711 and can also receive and process messages (e.g., e-mails) from the LAN, WAN, wireless data or e-mail system 713.

When a subscriber dials into the electronic network 706 from the communication device 702, the carrier network 716 routes the incoming call from the PSTN 714 to the communication node 712 over one or more telephone lines or trunks. The incoming calls preferably enter the carrier network 716 through one or more "888" or "800" Inward Wide Area Telecommunications Services trunk lines, local exchange or long distance trunk lines. It is also contemplated that the incoming calls can be received from a cable, cellular or VOIP network or any other suitable system.

The communication node 712 answers the incoming call from the carrier network 716 and retrieves an appropriate announcement (e.g., a welcome greeting) from a database, server or browser. The communication node 712 then plays the announcement to the caller. In response to audio inputs from the subscriber, the communication node 712 retrieves information from a destination or database of one or more of the information sources, such as the content providers 708, 721 or the voice and data markup language servers 709, 751, 753, 757. After the communication node 712 receives the information, it provides a response to the subscriber based upon the retrieved information.

The communication node 712 can provide various dialog voice personalities (e.g., a female voice, a male voice, etc.), and can implement various grammars (e.g., vocabulary) to detect and respond to the audio inputs from the subscriber. In addition, the communication node 712 can automatically select various speech recognition models (e.g., English, Spanish or English accent models) based upon a subscriber's profile, communication device and/or speech patterns. The communication node 712 can also allow the subscriber to select a particular speech recognition model.

When a subscriber accesses the electronic network 706 from a communication device 712 registered with the system (e.g., home telephone, work telephone, cellular telephone, etc.), the communication node 712 can by-pass a subscriber screening option and automatically identify the subscriber (or the type of communication device) through the use of ANI or CLI. After the communication node verifies the call, the communication node provides a greeting (e.g., "Hi, this is your personal agent, Maya. Welcome Bob. How may I help you?"). The communication node then enters into a dialogue with the subscriber, and the subscriber can select a variety of services offered by the communication node.

When the subscriber accesses the electronic network 706 from a communication device not registered with the system (e.g., a payphone, a telephone of a non-subscriber, etc.), the communication node answers the call and prompts the subscriber to enter his or her name and/or a personal identification number (PIN) using voice commands or DTMF signals. The communication node can also utilize speaker verification to identify the particular speech pattern of the subscriber. If the communication node authorizes the subscriber to access the system, the communication node provides a personal greeting to the subscriber (e.g., "Hi, this is your personal agent, Maya. Welcome Ann. How may I help you?"). The communication node then enters into a dialogue with the subscriber, and the subscriber can select various services offered by the communication node. If the name and/or PIN of the subscriber cannot be recognized or verified by the communication node, the subscriber will be routed to a customer service representative.

Once the subscriber has accessed the communication system, the subscriber may implement a wide variety of services and features by using voice commands, such as, for example, voice dialing, voice paging, facsimiles, caller announcements, voice mails, reminders, call forwarding, call recording, content information (e.g., newspapers, etc.), read e-mail, read calendars, read "to-do" lists, banking, e-commerce, v-commerce, etc. The communication system can place outbound calls and pages to business and personal parties or contacts (e.g., friends, clients, business associates, family members, etc.) in response to DTMF signals or voice commands. The calls can be routed through a telephone or electronic network to the selected party and the pagers can be sent to a selected party via a paging system. The communication system can also receive calls routed through a telephone or electronic network.

As shown in FIG. 7, the communication node 712 preferably includes a telephone switch 730, a voice or audio recognition (VRU) client 732, a VRU server 734, a controller or call control unit 736, an Operation and Maintenance Office or a billing server unit 738, a LAN 740, an application server unit 742, a database server unit 744, a gateway server or router firewall server unit 746, a VOIP unit 748, a voice browser 750, a voice markup language server 751, a messaging server 755 and a data markup language server 753. Although the communication node 712 is shown as being constructed with various types of independent and separate units or devices, the communication node 712 can be implemented by one or more integrated circuits, microprocessors, microcontrollers or computers which may be programmed to execute the operations or functions equivalent to those performed by the devices or units shown. It will also be recognized that the communication node 712 can be carried out in the form of hardware components and circuit designs and/or software or computer programs.

The communication node 712 can be located in various geographic locations throughout the world or the United States (e.g., Chicago, Ill.). The communication node 712 can be operated by one or more carriers (e.g., Sprint, Qwest, MCI, etc.) or independent service providers (e.g., Motorola, Inc.).

The communication node 712 can be integrated with the carrier network or can be located remote from the carrier network. It is also contemplated that the communication node 712 may be integrated into a communication device, such as, for example, a wire-line or wireless telephone, a radio device, a PC, a PDA, a PIM, etc., and can be programmed to connect or link directly to an information source.

The communication node 712 can also be configured as a standalone system to allow subscribers to dial directly into the communication node 712 via a direct access telephone number. In addition, the communication node may comprise a telephony switch (e.g., a PBX or Centrix unit), an enterprise network or a LAN. In this configuration, the communication system can be implemented to automatically connect a subscriber to the communication node 712 when the subscriber accesses a communication device.

When the telephone switch 730 receives an incoming call from the carrier network, the call control unit 736 sets up a connection in the telephone switch 730 to the VRU client 732. The communication node then enters into a dialog with the subscriber regarding various services and functions. The VRU client 732 preferably generates pre-recorded voice announcements and/or messages to prompt the subscriber to provide inputs to the communication node 712 using voice commands or DTMF signals. In response to the inputs from the subscriber, the communication node 712 retrieves information from a destination of one of the information sources and provides outputs to the subscriber.

The telephone switch 730 is preferably connected to the VRU client 732, the VOIP unit 748 and the LAN 740. The telephone switch 730 receives incoming calls from the carrier network 53. The telephone switch 730 also receives incoming calls from the communication device routed over the Internet via the VOIP unit 748. The telephone switch 730 also receives messages and pages from communication devices 701 and 703, respectively. The telephone switch 730 is preferably a digital cross-connect switch, Model LNX, available from Excel Switching Corporation, Hyannis, Mass. It will be recognized that the telephone switch 730 can be any suitable switch.

The VRU client 732 is preferably connected to the VRU server 734 and the LAN 740. The VRU client 732 processes voice communications, DTMF signals, pages and messages (e.g., e-mails). Upon receiving voice communications, the VRU client 732 routes the speech communications to the VRU server 734. When the VRU client 732 detects DTMF signals, it sends a command to the call control unit 736. It will be recognized that the VRU client 732 can be integrated with the VRU server 734.

The VRU client 732 preferably comprises a PC, such as, for example, a Windows NT compatible PC, with hardware capable of connecting individual telephone lines directly to the telephone switch 730 or carrier network 53. The VRU client 732 preferably includes a microprocessor, random access memory, read-only memory, a T1 or ISDN interface board, and one or more voice communication processing boards (not shown). The voice communication processing boards are preferably Dialogic boards, Antares Model, available from Dialogic Corporation, Parsippany, N.J. The voice communication boards may include a voice recognition engine having a vocabulary for detecting a speech pattern. The voice recognition engine is preferably a RecServer software package, available from Nuance Communications, Menlo Park, Calif.

The VRU client 732 can also include an echo canceller (not shown) to reduce or cancel TTS or playback echoes transmitted from the PSTN due to hybrid impedance mismatches. The echo canceller is preferably included in an Antares Board Support Package, also available from Dialogic.

The call control unit 736 is preferably connected to the LAN 740, and sets up the telephone switch 730 to connect incoming calls to the VRU client 732. The call control unit 736 also sets up incoming calls or pages to the communication node over the Internet 1220 and pages and messages sent from the communication devices via the paging network 711 and e-mail system 713, respectively. The control call unit 736 preferably comprises a PC, such as, for example, a Windows NT compatible PC.

The LAN 740 allows the various components and devices of the communication node to communicate with each other via twisted pair, fiber optic, coaxial cables or the like. The LAN 740 may use Ethernet, Token Ring or other suitable types of protocols. The LAN 740 is preferably a 100 Megabit per second Ethernet switch, available from Cisco Systems, San Jose, Calif., and can comprise any suitable network system. The communication node may include a plurality of LANs.

The VRU server 734 is connected to the VRU client 732 and the LAN 740. The VRU server 734 receives voice communications from the subscriber via the VRU client 732. The VRU server 734 processes the voice communications and compares the voice communications against a vocabulary or grammar stored in the database server unit 744 or a similar memory device. The VRU server 734 provides output signals, representing the result of the voice communications processing, to the LAN 740. The LAN 740 routes the output signal to the call control unit 736, the application server unit 742 and/or the voice browser 750. The communication node then performs a specific function associated with the output signals.

The VRU server 734 preferably includes a TTS unit 752, an automatic speech recognition (ASR) unit 754, and a STT unit 756. The TTS unit 752 receives textual data or information (e.g., e-mail, web pages, documents, files, etc.) from the application server unit 742, the database server unit 744, the call control unit 736, the gateway server unit 746, the application server unit 742 and the voice browser 750. The TTS unit 752 processes the textual data and converts the data to voice data or information.

The TTS unit 752 can provide data to the VRU client 732, which reads or plays the data to the subscriber. For example, when the subscriber requests information (e.g., news updates, stock information, traffic conditions, etc.), the communication node retrieves the desired data (e.g., textual information) from a destination of the one or more of the information sources and converts the data via the TTS unit 752 into a response.

The response is then sent to the VRU client 732. The VRU client 732 processes the response and reads an audio message to the subscriber based upon the response. It is contemplated that the VRU server 734 can read the audio message to the subscriber using human recorded speech or synthesized speech. The TTS unit 752 is preferably a TTS 2000 software package, available from Lernout and Hauspie Speech Product NV, Burlington, Mass.

The ASR unit 754 provides speaker dependent or independent automatic voice recognition of voice communications from the subscriber. It is contemplated that the ASR unit 754 can include speaker dependent voice recognition. The ASR unit 754 processes the voice communications to determine whether a word or a speech pattern matches any of the grammars or vocabulary stored in the database server unit 744 or downloaded from the voice browser 750. When the ASR unit 754 identifies a selected speech pattern of the voice communications, the ASR unit 754 sends an output signal to implement the specific function associated with the recognized speech pattern. The ASR unit 754 is preferably a speaker independent voice recognition software package, RecServer Model, also available from Nuance Communications. It is contemplated that the ASR unit 754 can be any suitable voice recognition unit to detect voice communications.

The STT unit 756 receives voice communications and converts the voice communications to textual information (e.g., a text message). The textual information can be sent or routed to the communication devices 701, 702, 703, 704, 705 the content providers 708, 721, the markup language servers 709, 751, 753, 757, the voice browser 750 and the application server unit 742. The STT unit 756 is preferably a Naturally Speaking software package, available from Dragon Systems, Newton, Mass.

The VOIP unit 748 is preferably connected to the telephone switch 730 and the LAN 740. The VOIP unit 748 allows a subscriber to access the communication node via the Internet or VOIP public network using voice commands. The VOIP unit 748 can receive VOIP protocols (e.g., H.323 protocols) transmitted over the Internet or Intranet, and can convert the VOIP protocols to voice information or data. The voice information can then be read to the subscriber via the VRU client 732. The VOIP unit 748 can also receive voice communications from the subscriber and convert the voice communications to a VOIP protocol that can be transmitted over the Internet. The VOIP unit 748 is preferably a Voice Net software package, also available from Dialogic Corporation. It will be recognized that the VOIP unit 748 can be incorporated into a communication device.

The communication node also includes a detection unit 760. The detection unit 760 is preferably a phrase or key word spotter unit, detecting incoming audio inputs or communications or DTMF signals from the subscriber. The detection unit 760 is preferably incorporated into the telephone switch 730, but can be incorporated into the VRU client 732, the carrier network or the VRU server 734. The detection unit 760 is preferably included in a RecServer software package, also available from Nuance Communications.

The detection unit 760 records the audio inputs from the subscriber and compares the audio inputs to the vocabulary or grammar stored in the database server unit 744. The detection unit 760 continuously monitors the subscriber's audio inputs for a key phase or word after the subscriber is connected to the node. When the detection unit 760 detects the key phrase or word, the VRU client 732 plays a prerecorded message to the subscriber. The VRU client 732 then responds to the audio inputs provided by the subscriber.

The billing server unit 738 is preferably connected to the LAN 740. The billing server unit 738 can record data about the use of the communication node by a subscriber (e.g., length of calls, features accessed by the subscriber, etc.). Upon completion of a call by a subscriber, the call control unit 736 sends data to the billing server unit 738. The billing server unit 738 can subsequently process the data in order to prepare customer bills. The billing server unit 738 can use the ANI or CLI of the communication device to properly bill the subscriber. The billing server unit 738 preferably comprises a Windows NT compatible PC.

The gateway server unit 746 is preferably connected to the LAN 740 and the Internet. The gateway server unit 746 provides access to the content provider 721 and the voice markup language server 757 via the Internet. The gateway server unit 746 allows subscribers to access the communication node from the communication device 704 via the Internet. The gateway server unit 746 can function as a firewall to control access to the communication node to authorized subscribers. The gateway server unit 746 is preferably a Cisco Router, also available from Cisco Systems.

The database server unit 744 is preferably connected to the LAN 740. The database server unit 744 preferably includes a plurality of storage areas to store data relating to subscribers, such as, for example, speech vocabularies, dialogs, personalities, subscriber entered data, and other information. Preferably, the database server unit 744 stores a personal file or address book 122. The personal address book 122 can contain information required for the operation of the communication system, including subscriber reference numbers, personal access codes, personal account information, contact's addresses, telephone numbers, etc. The database server unit 744 is preferably a PC, such as, for example, a Windows NT compatible PC. The database also shows user-selected data (i.e. user data such as home, phone, address, billing information etc.).

The application server unit 742 is preferably connected to the LAN 740 and the content provider 708. The application server unit 742 allows the communication node to access information from a destination of the information sources, such as the content providers 708, 721 and the markup language servers 709, 751, 753, 757. For example, the application server unit 742 can retrieve information (e.g., weather reports, stock information, traffic reports, restaurants, flower shops, banks, calendars, "to-do" lists, e-commerce, etc.) from a destination of the information sources. This application server unit 742 may include Starfish Software to provide the address book 122, calendar and to-do lists, and to allow the subscriber to organize information. The application server unit 742 processes the retrieved information and provides the information to the VRU server 734 and the voice browser 750. The VRU server 734 can provide an audio announcement to the subscriber based upon the information using TTS synthesizing or human recorded voice. The application server unit 742 can also send tasks or requests (e.g., transactional information) received from the subscriber to the information sources (e.g., a request to place an order for a pizza). The application server unit 742 can further receive subscriber inputs from the VRU server 734 based upon a speech recognition output. The application server unit 742 is preferably a PC.

The voice markup language server 751 is preferably connected to the LAN 740. The voice markup language server 751 can include a database, scripts and markup language documents or pages. The voice markup language server 751 is preferably a PC, such as, for example, a Windows NT compatible PC. It will also be recognized that the voice markup language server 751 can be an Internet server (e.g., a Sun Microsystems server).

The messaging server 755 is preferably connected to the LAN 740, the paging network 711, an e-mail system 713 and a short message system (SMS) 790. The messaging server 755 routes pages between the LAN 740 and the paging network 711. The messaging server 755 is preferably a PC, such as, for example, a Windows NT compatible PC. The messaging server 755 can also provide E-mail storage. It is contemplated that the messaging server 755 can reside externally from the communication node. The messaging server can further include Exchange Server™ software from Microsoft.

The voice browser 750 is preferably connected to the LAN 740. The voice browser 750 preferably receives information from the markup language servers 709, 751, 753, 757, the database server unit 744 and the content providers 708, 721. In response to voice commands or DTMF signals, the voice browser 750 generates a content request (e.g., an electronic address) to navigate to a destination of one or more of the information sources. The content request can use at least a portion of a Uniform Resource Locator, an Internet Protocol, a page request, or e-mail.

After the voice browser 750 is connected to an information source, the voice browser 750 preferably uses a Transmission Control Protocol/Internet Protocol connection to pass requests to the information source. The information source responds to the requests, sending at least a portion of the requested information, represented in electronic form, to the voice browser 750. The information can be stored in a database, and can include text content, markup language document or pages, non-text content, dialogs, audio sample data, recognition grammars, etc. The voice browser 750 then parses and interprets the information, further described below. The voice browser 750 can be integrated into the communication devices 701, 702, 703, 704, 705.

As shown in FIG. 7, the content provider 708 is connected to the application server unit 742 of the communication node, and the content provider 721 is connected to the gateway server unit 746 of the communication node via the Internet. The content providers 708, 721 can store various content information, such as news, banking, v-commerce, commerce, weather, traffic conditions, etc. The content providers 708, 721 can include a server to operate WWW pages or documents in the form of a markup language. The content providers 708, 721 can also include a database, scripts and/or markup language documents or pages. The scripts can include images, audio, grammars, computer programs, etc. The content providers 708, 721 execute suitable server software to send requested information to the voice browser 750.

The voice mail unit 774 is preferably connected to the telephone switch 122 and the LAN 740. The voice mail unit 774 can store voice mail messages from parties trying to send messages to the communication node. When a subscriber accesses the electronic network, the voice mail unit 774 can notify the subscriber of new and stored messages. The subscriber can access the messages to play, delete, store and forward the messages. When the subscriber accesses a message, the message can be read to the subscriber or can be displayed as textual information on a communication device (e.g., a pager, a SMS 790, or a PDA, etc.). The subscriber can also access and operate external messages or mail systems remote from the electronic network.

The FAX server unit 772 is preferably connected to the telephone switch 730 and the LAN 740. The FAX server unit 772 receivers and stores facsimile information sent via the electronic network or the carrier network. Subscribers can access the facsimile information to play, store, delete, and forward the information. The facsimile information can be read via the TTS unit 752 or can be displayed as textual information on a suitable communication device. The FAX server unit 772 preferably comprises a PC, such as, for example, a Windows NT compatible PC or a Dialogue Fax Server.

Further information regarding communication system is disclosed in U.S. patent application Ser. No. 09/141,485, entitled "Telecommunication System and Methods Therefor," filed Aug. 27, 1998, the entire application of which is incorporated by reference herein.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

What is claimed is:

1. A method for storing a number in an address book of a mobile subscriber device comprising the steps of:
   receiving, by a communications node, said number from said mobile subscriber device;
   creating, by said communications node, a Call Detail Record (CDR) corresponding to said number;
   determining, by said communications node, whether said number matches one of a first plurality of numbers stored in said address book of said mobile subscriber device;
   creating, by said communications node, a Candidate Number Record (CNR) corresponding to said number;
   determining, by said communications node, whether communications node had an existing CNR entry for said number within a CNR list corresponding to said mobile subscriber device; and
   storing said CNR in said CNR list by one of:
   a) creating a new entry for said CNR in said CNR list in response to determining that an existing CNR entry for said number is not found by said communications node, and
   b) updating said existing CNR entry with said CNR in response to determining that said existing CNR entry for said number is found by said communications node;
   providing an output of said CNR list to said mobile subscriber device;
   receiving, by said communications node, a command from said mobile subscriber device, said command corresponding to a user selection of said number from said CNR, corresponding to said number contained within said CNR list;
   adding, by said communications node, an entry to said address book of said mobile subscriber device for said number in response to said command.

2. The method of claim 1, wherein b) updating said existing CNR entry with said CNR further comprises:
   incrementing a counter if the called number associated with the identified record is included within the list.

3. The method of claim 1, further comprising the steps of:
   determining the number of entries included in said CNR list; and
   deleting at least one CNR entry if the number of CNR entries exceeds a predetermined number.

4. The method of claim 1, further comprising the step of placing said number at the top of said CNR list.

5. The method of claim 1, wherein at least one entry of the address book includes hyperlinks corresponding to surnames of persons entered in the address book; and further including the step of referencing the address book via the hyperlinks.

6. The method of claim 1, further comprising the step of accessing the address book via voice commands.

7. The method of claim 1, further comprising the step of accessing the address book using a device having a display.

* * * * *